United States Patent
Kang (10) Patent No.: US 6,810,374 B2
(45) Date of Patent: Oct. 26, 2004

(54) KOREAN ROMANIZATION SYSTEM (76) Inventor: Pilwon Kang, 2889 Kelly Sq., Vienna, VA (US) 22181

(*) Notice: Subject to any disclaimer, the term of this patent is extended or adjusted under 35 U.S.C. 154(b) by 243 days.

(21) Appl. No.: 09/909,864

(22) Filed: Jul. 23, 2001

(65) Prior Publication Data
US 2003/0074185 A1 Apr. 17, 2003

(51) Int. Cl.$^7$ .......................... G06F 17/28; G06F 17/21
(52) U.S. Cl. .......................................................... 704/2
(58) Field of Search ..................... 704/3, 2, 8; 715/535; 345/352, 326; 400/472, 109

(56) References Cited

U.S. PATENT DOCUMENTS

| | | | | |
|---|---|---|---|---|
| 4,187,031 A | * | 2/1980 | Yeh .............................. 400/83 |
| 4,827,530 A | * | 5/1989 | Yamaguchi et al. ........... 341/28 |
| 5,131,766 A | * | 7/1992 | Wong .......................... 715/535 |
| 5,360,343 A | * | 11/1994 | Tang ........................... 715/535 |
| 5,893,133 A | * | 4/1999 | Chen ........................... 707/535 |
| 5,903,861 A | * | 5/1999 | Chan .............................. 704/9 |
| 5,945,928 A | * | 8/1999 | Kusher et al. ................. 341/28 |
| 6,170,000 B1 | * | 1/2001 | Bories et al. ................ 707/535 |
| 6,292,768 B1 | * | 9/2001 | Chan .............................. 704/1 |

* cited by examiner

Primary Examiner—Patrick N. Edouard
(74) Attorney, Agent, or Firm—Robert E. Bushnell, Esq.

(57) ABSTRACT

An unambiguous bidirectional transliteration system is provided. A look-up table having a unique and unambiguous correspondence between individual Korean language vowels and Korean language consonants, and one or more characters of English language is implemented into the computerized transliteration system. The table is constructed to assure phonetic fidelity between pronunciation of the individual syllables of Korean language and the syllables of English language. The system can unambiguously covert Korean syllables into corresponding English syllables based on the look-up table and can unambiguously convert the English syllables into Korean syllables based on the look-up table. A Hangul input method and Hangul input system are provided based on this bidirectional transliteration system.

13 Claims, 11 Drawing Sheets

FIG 1 (RELATED ART)

| Korean consonants | English alphabet | Korean vowels | English alphabet |
|---|---|---|---|
| ㄱ | K, G | ㅏ | A |
| ㄴ | N | ㅑ | YA |
| ㄷ | T, D | ㅓ | O |
| ㄹ | R, L | ㅕ | YO, YŎ |
| ㅁ | M | ㅗ | O |
| ㅂ | P, B | ㅛ | YO |
| ㅅ | S, SH | ㅜ | U, |
| ㅇ | [nt], NG | ㅠ | YU |
| ㅈ | CH, J | ㅡ | U, Ŭ |
| ㅊ | CH, CH' | ㅣ | I |
| ㅋ | K, K' | ㅐ | AE |
| ㅌ | T, T' | ㅒ | YAE |
| ㅍ | P, P' | ㅔ | E |
| ㅎ | H | ㅖ | YE |
|  |  | ㅢ | UI, ŬI |
|  |  | ㅟ | WI |
|  |  | ㅚ | OE |
|  |  | ㅘ | WA |
|  |  | ㅙ | W AE |
|  |  | ㅝ | WO, WŎ |
|  |  | ㅞ | WE |

FIG 2A (RELATED ART)

| | |
|---|---|
| Syllables of Korean Language | 미 국 |
| Syllables of English Language | MIGUK |
| Reverse transliteration | |
| Syllables of Korean Language(1) | 믹욱 |
| Syllables of Korean Language(2) | 믹윽 |
| Syllables of Korean Language(3) | 믹윾 |

FIG 2B (RELATED ART)

| | |
|---|---|
| Syllables of Korean Language | 특 허 청 |
| Syllables of English Language | Túkhocȟong |
| | Tukhochong |
| | Tŭkhŏchŏng |

FIG 3

| Korean consonants | | English alphabet |
|---|---|---|
| ㄱ | | G |
| ㄴ | | N |
| ㄷ | | D |
| ㄹ | (Initial) | R |
| ㄹ | (Final) | L |
| ㅁ | | M |
| ㅂ | | B |
| ㅅ | | S |
| ㅇ | (Initial) | [nt: not transliterated] |
| ㅇ | (Final) | NG |
| ㅈ | | J |
| ㅊ | | CH |
| ㅋ | | K |
| ㅌ | | T |
| ㅍ | | P |
| ㅎ | | H |

FIG 4

| Korean vowels | English alphabet |
|---|---|
| ㅏ | A |
| ㅑ | YA |
| ㅓ | U |
| ㅕ | YU |
| ㅗ | O |
| ㅛ | YO |
| ㅜ | OO |
| ㅠ | YOO |
| ㅡ | EU |
| ㅣ | I |
| ㅐ | AE |
| ㅒ | YAE |
| ㅔ | E |
| ㅖ | YE |
| ㅘ | WA |
| ㅙ | WAE |
| ㅚ | OE |
| ㅝ | WO |
| ㅞ | WE |
| ㅟ | WI |
| ㅢ | UI |

FIG 5A

| | |
|---|---|
| Syllables of Korean language to be created | 미 국 |
| Typed syllables of English language | MI space key |
| Resulting syllables of Korean language | 미 |
| Typed syllables of English language | 미 GOOG space key |
| Resulting syllables of Korean language | 미 국 |

FIG 5B

| | |
|---|---|
| Syllables of Korean language to be created | 특 허 청 |
| Typed syllables of English language | TEUG space key |
| Resulting syllables of Korean Language | 특 |
| Typed syllables of English language | 특 HU space key |
| Resulting syllables of Korean language | 특 허 |
| Typed syllables of English language | 특 허 CHUNG space key |
| Resulting syllables of Korean language | 특 허 청 |

FIG 8C  TEUG HU CHUNG

FIG 8D  MI GOOG TEUG HU CHUNG

FIG 8E  MI GOOG TEUG HU CHUNG

KOREAN ROMANIZATION SYSTEM

BACKGROUND OF THE INVENTION

1. Field of the Invention

The present invention relates to a transliteration system allowing no ambiguity for both romanization and reverse transliteration processes of Korean language and providing the closest phonetic similarity between Korean characters of the Korean language and corresponding English alphabet renditions, and more particularly, to a transliteration system implemented into a computer for converting English syllables into Korean syllables and the Korean syllables into the English syllables with unambiguity and phonetic fidelity.

2. Description of the Prior Art

A foreign language is traditionally or typically romanized based on a phonetic way of how it is pronounced with only secondary consideration on the spelling in the native language. The McCune-Reischauer (M-R) system introduced in 1939 and currently used by U.S. government agencies is an example of the phonetic romanization system. According to the M-R system, a given Korean syllable can be transliterated into several different Latin language expressions depending on sound variations. Since the pronunciation of a Korean character depends on its position relative to adjacent characters and the pronunciation of a given syllable of the Korean language also varies from person to person and from one Korean province to another, the romanization of the given Korean syllables of the Korean language transliterated by the M-R system is ambiguous, complicated and difficult. Moreover, a reverse transliteration under the M-R system is also ambiguous since the romanized Latin expression can be identified with not just one but several different Korean expressions. Furthermore, another shortcoming of the M-R system is that there are no well established rules for placing a space and a hyphen between Korean syllables of the Korean language. There are additional ambiguities caused by many different ways of implementing diacritical symbols under the M-R system.

For example, a Korean geographical name 평안북도 can be romanized by the M-R system in at least 192 different ways, such as P'onganbuk-to, P'yŏnganbuk-to, P'yong'anbuk-to, P'yŏng'anbuk-to, P'yongan-bukto, Pyongan Puk-to, Pyongan-buk To, Pyongan Pukto, Pyonganbuk-To, and Pyongan-bukto. These variations are due to the combination of the following three different effects: a given Korean consonant or vowel of the Korean Language romanized into different Latin expressions; many different ways of using hyphens and spaces in the Latin expressions; the M-R system employing diacritics in many different ways.

Since the given original Korean syllable of Korean language is identified with the several different syllables of the Latin language, the information about the original Korean spelling would be lost during the romanization process. Therefore, the M-R system is not suited for computer data search and retrieval. Search for the original given Korean syllables is extremely difficult because a user has difficulties guessing in what romanized syllables of the Korean word or name were originally entered into the computer apparatus. Moreover, automatic transliteration of the M-R system is impossible in the computer because hundreds of pronunciation rules should be incorporated into transliteration software programmed in the computer and because many of the rules governing the use of the M-R system are variable and subjective.

According to traditional Korean romanization or transliteration systems, characters of Korean language are romanized into characters of English language by using a table showing a correspondence between the characters of Korean language and the characters of the English language as shown in a plurality of romanization tables of a Korean-English Dictionary published by Martin et al. which is available on an Internet site at http://www.sungwh.freeserve.co.uk/flux/korean.htm. These conventional systems, however, do not assure phonetic fidelity between pronunciation of the individual syllables of Korean language and the syllables of English language. An English syllabic consonant or vowel does not adequately represent the pronunciation of the corresponding Korean syllabic consonant or vowel.

Moreover, the conventional systems show ambiguity between the syllables of English language and the corresponding syllables of Korean language because the individual syllables of Korean are romanized into a plurality of several different syllables of English language and because the syllables of English language are assigned to a plurality of several different individual syllables of Korean language. Since the correspondence between the syllables of English language and the corresponding syllables of Korean language shows the ambiguity and lacks the phonetic fidelity, the conventional transliteration table can not be automated with a computer system for automatically converting the syllables of Korea language into the syllables of English language.

SUMMARY OF THE INVENTION

It is an object of the present invention to provide a transliteration system able to provide a unique and unambiguous correspondence between individual syllables of Korean language and syllables of English language.

It is another object of the present invention to provide a transliteration system implemented into a computer for automatically converting syllables of Korean language into syllables of English language or syllables of English language into syllables of Korean language.

It is still object to provide a transliteration system capable of assuring phonetic fidelity between syllables of Korean language and syllables of English language.

It is further object to provide a transliteration system able to prevent a given syllables of Korean language from being converted into more than one different syllables of English language.

It is further object to provide a romanization system able to prevent syllables of English language from being converted into more than two different syllables of Korean language.

It is also an object to provide a romanization system able to separate each of the syllables of the romanized word by a space so that the romanized word can be converted back to individual syllables of Korean language without ambiguity.

These and other objects may be achieved by providing a computerized romanization system including a keyboard having a plurality of keys each representing a different English language character, a memory having a lookup table showing a unique and unambiguous correspondence between individual Korean language vowels and Korean language consonants, and English language vowels and English language consonants, with the table being constructed to assure phonetic fidelity between pronunciation of the individual Korean language characters and the corresponding English characters, a microprocessor connected to the keyboard and a display device.

This invention provides a Korean language input method where the microprocessor receives through the key board, a source passage of serial groups of one or more keystrokes of the English language characters with each of the group comprising selected syllables of English language, the microprocessor automatically converting each of the serial groups of English language characters into a destination passage in Korean language having the individual syllables of Korean language in accordance with the look-up table, and a video display device providing a visual display of the destination passage containing the individual syllables of Korean language. The microprocessor receives through the keyboard a "source" passage of English syllables, which represent Korean syllables. Upon the user's command, the microprocessor converts the English syllables into a "destination" passage comprising the Korean syllables equivalent to the source passage in accordance with the look-up table of FIG. 3 and FIG. 4. When the English syllables corresponding to the individual syllables of Korean language are typed into the computer system and followed by a space keystroke, the English syllables are automatically converted into the corresponding individual syllables of Korean language. A video display device provides a visual display of the source passage first, which is then replaced by the destination passage after the conversion takes place.

This invention also contemplates machine transliteration software to be implemented into a computerized system having a microprocessor and a look-up table. Serial groups of Korean syllables, such as one created by a Korean word-processor that are contained in the memory and displayed on the screen, are automatically converted into the corresponding serial groups of English syllables in accordance with the look-up table.

BRIEF DESCRIPTION OF THE DRAWINGS

A more complete application of this invention, and many of the attendant advantage thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
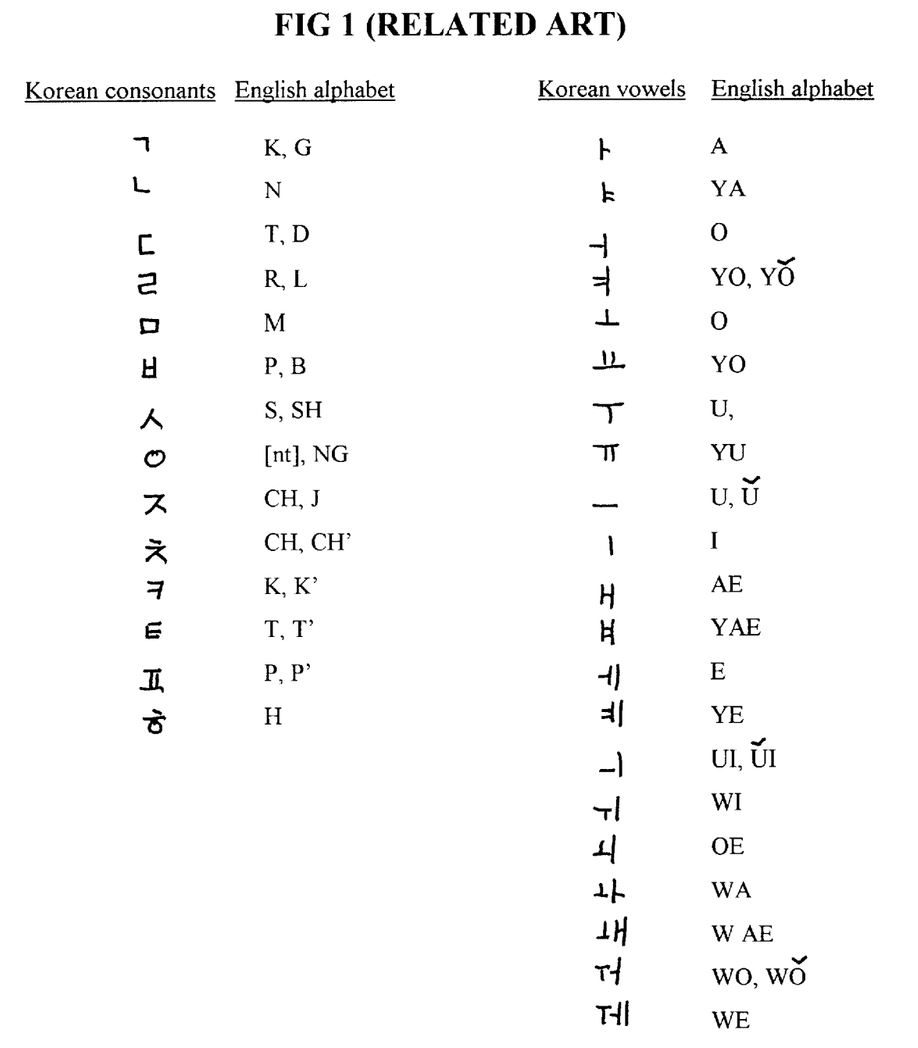
FIG. 1 is a M-R transliteration table showing Hangul letters (Korean consonants and vowels) and English alphabet assigned to each of Korean consonants or vowels.
Figure 2A:
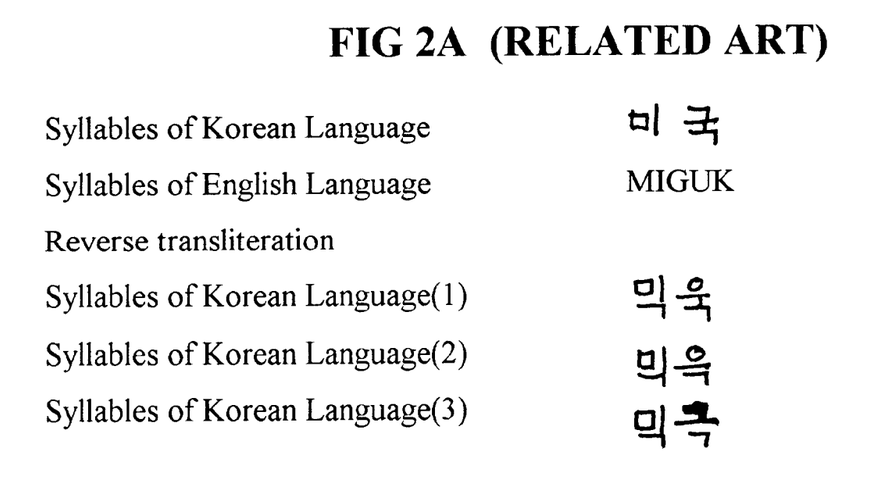
FIGS. 2A and 2B show examples of how syllables of Korean language are converted into syllables of English language and how the results are then converted back to Korean syllables using the table of FIG. 1.
Figure 2B:
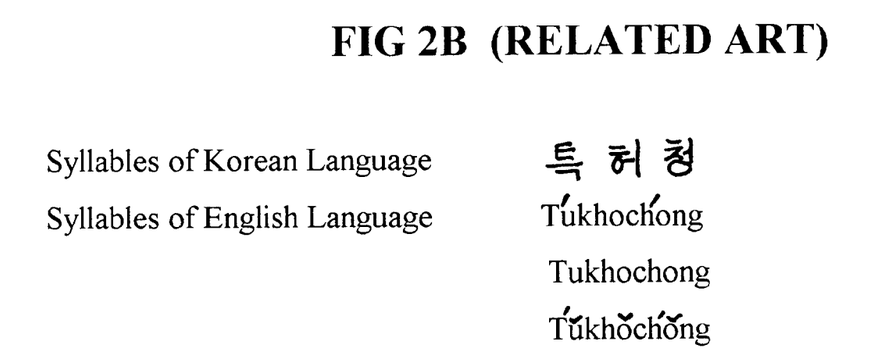

Returning now to the drawings, the related art shown in FIG. 1 illustrates a table showing each assignment between English language alphabet and Hangul (Korean language consonants and vowels) which are described in the McCune-Reischauer system which is the United States government standard. FIG. 2A shows ambiguity of conversion from English to Korean and FIG. 2B shows ambiguity of conversion from Korean to English.

According to FIG. 1, English language alphabet is assigned to each of Korean language consonants as follows. For examples, "K or G" is assigned to "ㄱ"; "T or D" to "ㄷ"; "P or B" to "ㅂ"; "S or SH" to "ㅅ"; "CH or J" to "ㅈ"; "CH or CH'" to "ㅊ"; "K or K'" to "ㅋ"; "T or T'" to "ㅌ"; "P or P'" to "ㅍ".

"K" is converted into two different Korean language consonants "ㄱ" and "ㅋ" while "CH" is converted into two different Korean language consonants "ㅈ" and "ㅊ." Moreover, "P" is converted into a Korean language consonant "ㅂ" or "ㅍ."

As shown in FIG. 2A, syllables of English language MIGUK and ILLYU romanized from syllables of Korean language "미국" and "인류" might be reverse-transliterated into several different syllables of Korean language each different from the original syllables of Korean language if the syllables of English language is converted into syllables of Korean language based on the table of FIG. 1. As shown in FIG. 2B, the Korean word "특허청" can be transliterated in several different ways.

Figure 3:
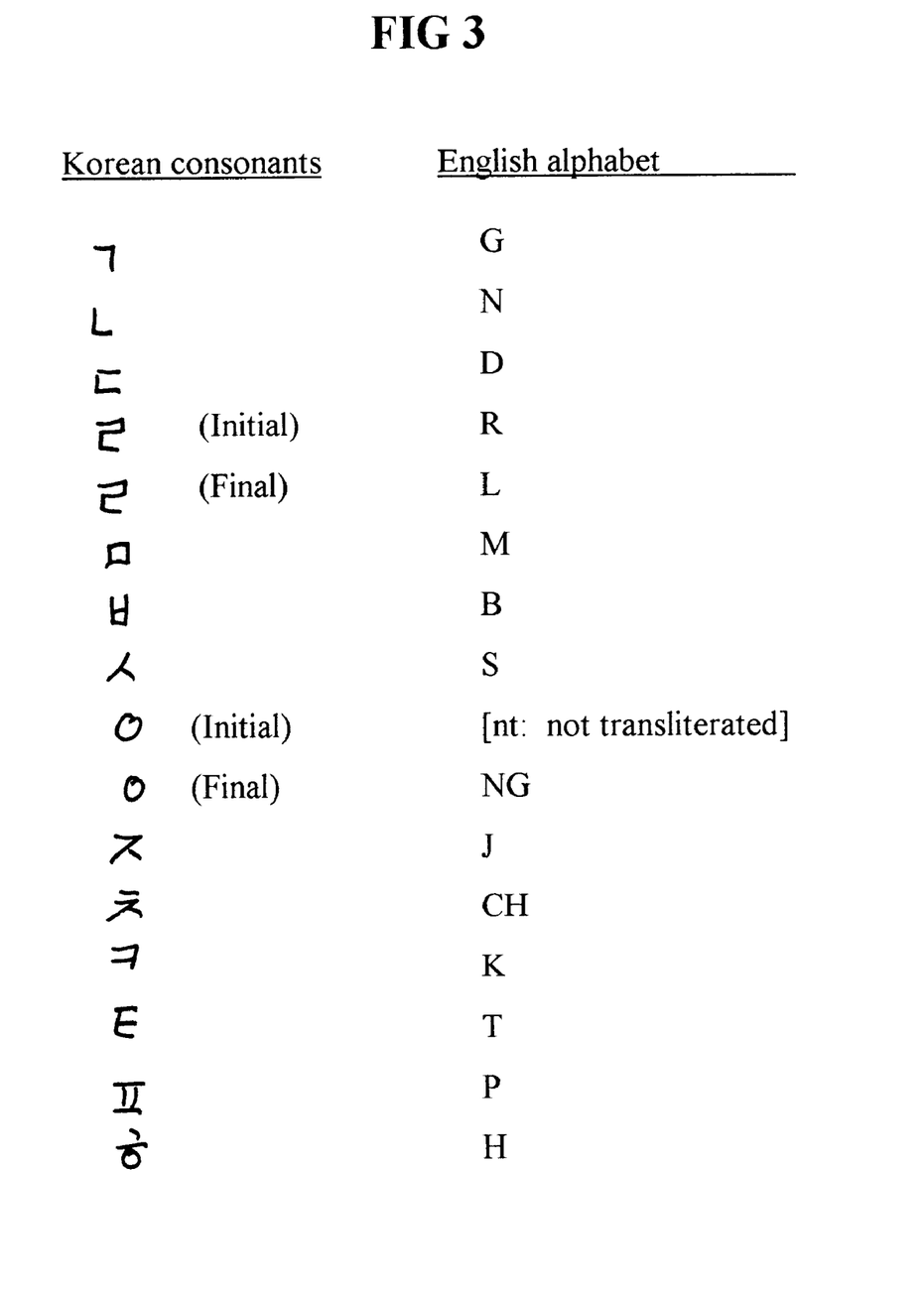
FIG. 3 is a table showing Korean consonants and English language alphabet assigned to each of Korean language consonants constructed by the principle of the present invention.

FIG. 3 is a table showing Korean language consonants and English language alphabet assigned to each of Korean consonants constructed by the principle of the present invention. For example, Korean consonant "ㄱ", "ㅂ", "ㅈ", "ㅊ", "ㅋ", "ㅌ", and "ㅍ" are romanized into G, B, J, CH, K, T, and P, respectively. Only one Korean language consonant is assigned to only unique English alphabet of which pronunciation is closest to the corresponding Korean language consonant. An initial Korean language consonant "ㄹ" of syllables of Korean language is converted to "R" while a final Korean language consonant "ㄹ" of syllables of Korean language is romanized to "L".

Figure 4:
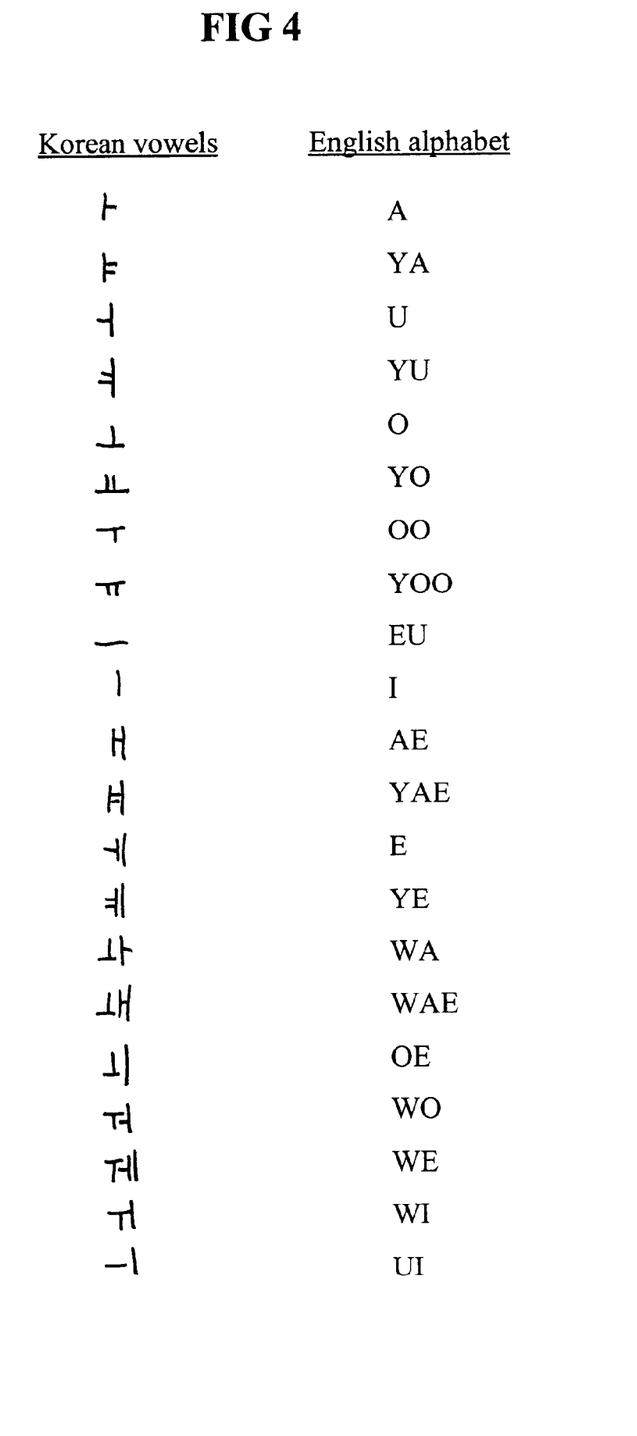
FIG. 4 is a table showing Korean language vowels and English language alphabet assigned to each of Korean language vowels constructed by the principle of the present invention.

FIG. 4 is a table showing Korean language vowels and English language alphabet assigned to each of Korean language vowels. For example, the Korean vowels "ㅓ", "ㅗ", "ㅜ", and "ㅠ" are assigned to "U", "O", "OO", and "YOO", respectively.

Figure 5A:
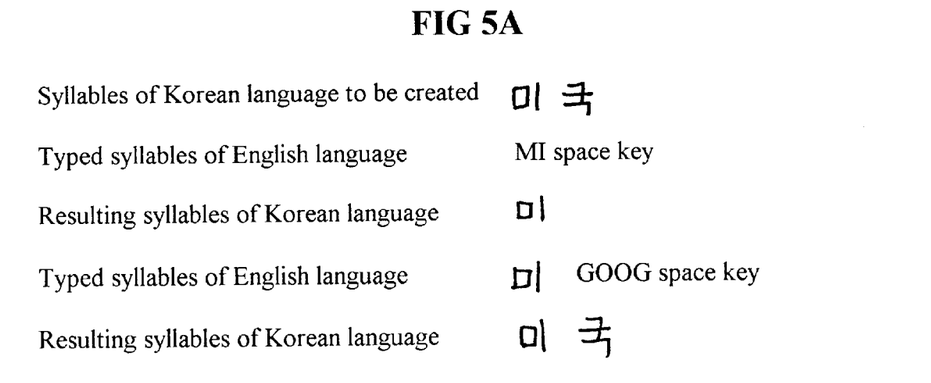
FIGS. 5A and 5B show an input method converting syllables of English language into syllables of Korean language in accordance with the tables of FIGS. 3 and 4.
Figure 5B:
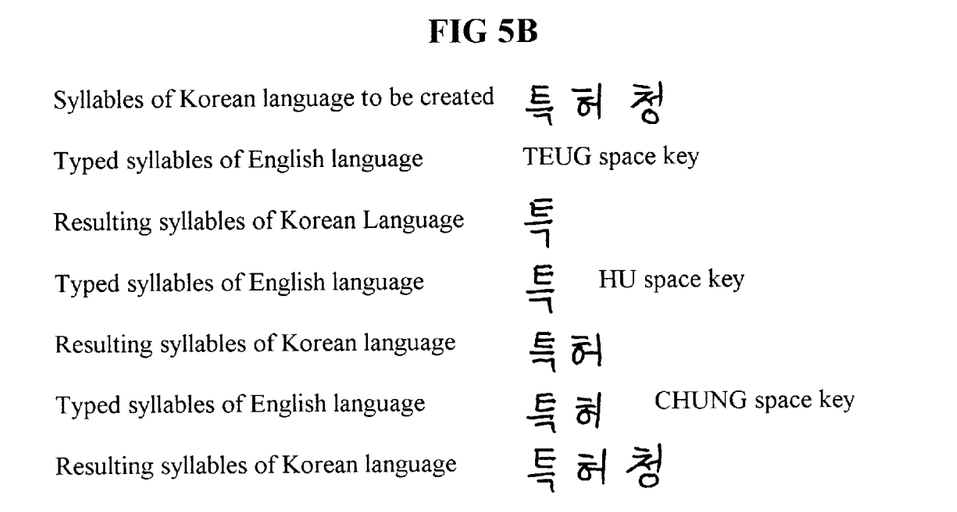

FIGS. 5A and 5B illustrate an input method of the present invention for creating syllables of Korean language.

As shown in FIGS. 5A and 5B, when "MI" of English syllables is typed and followed by a space key stroke, then "MI" is converted into "미" which appears on a screen in a place where MI is displaced. If "GOOG" of English syllables is input, "GOOG" is displayed adjacent to "미", the converted Korean syllable. "GOOG" of English syllables is converted into "국" of Korean syllables when a space key stroke follows "GOOG." "미국" of the Korean syllables means the United States of America. To create 특허청" of Korean syllables using the present input method, "TEUG" of English syllables is typed and followed by a space key stroke; then "TEUG" is converted into "특" which is shown on the screen. If "HU" of English syllables is input, "HU" is displayed on the screen adjacent to "특" of the converted Korean syllables. "HU" of English syllables is converted into "허" of Korean syllables when a space key stroke follows "HU." The next syllable "CHUNG" is then typed, which is displayed on the screen adjacent to "특허" of the converted Korean syllables. By the space key stroke, "CHUNG" of English syllables is converted into "청" of Korean syllables, and the inputting of "TEUG HU CHUNG" and the resultant creation of "특허청" is completed as shown in FIG. 5B. During the typing, each of the English syllables is distinguished by the space key stroke from others of the English syllables. FIGS. 5A and 5B illustrate complete unambiguity during conversion from the English syllables to the Korean syllables because of the unique and unambiguous correspondence between each of Korean syllables and each of English syllables and because of the space key stroke used after each syllable, thus distinguishing each of English syllables.

Figure 6:
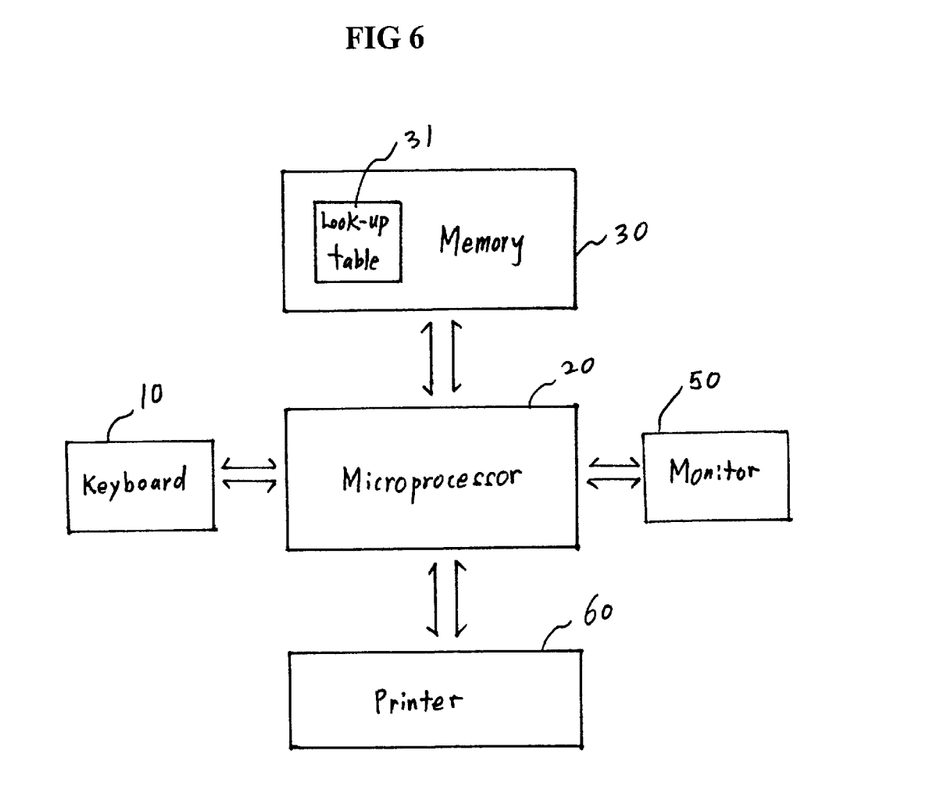
FIG. 6 is a schematic block diagram showing a computer architecture in which a correspondence between syllables of Korean language and syllables of English language is implemented according to the principles of the present invention for practice of an input process and a machine transliteration.
Figure 7A:
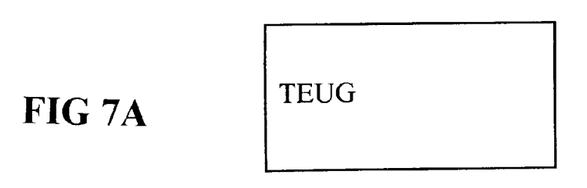
FIGS. 7A through 7F show visual displays provided by a video display device to illustrate the input process converting English syllables into Korean syllables according to FIGS. 5A and 5B.
Figure 7B:
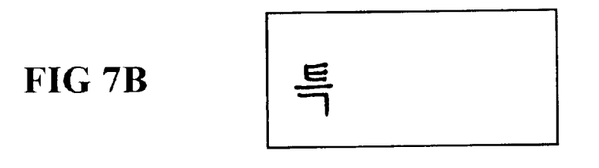
Figure 7C:
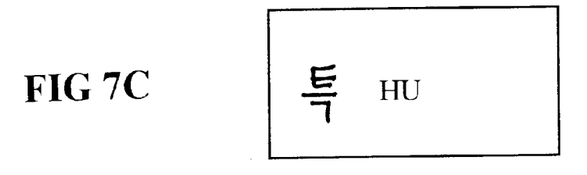
Figure 7D:
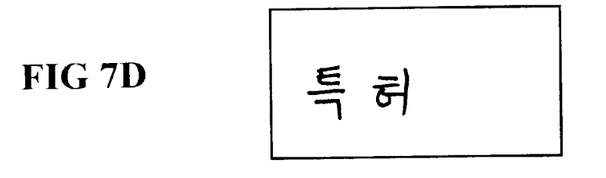
Figure 7E:
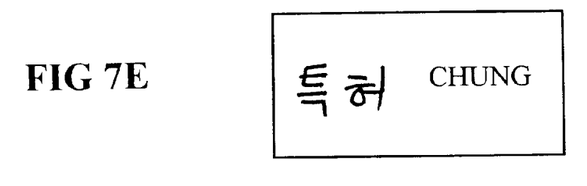
Figure 7F:
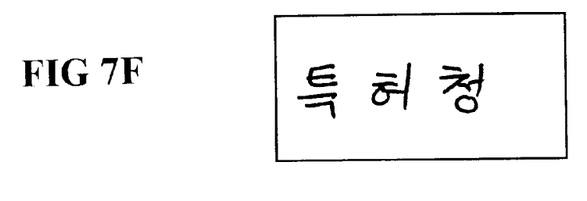

A schematic block diagram of FIG. 6 shows a computerized transliteration system for converting Korean syllables to English syllables or converting English syllables to Korean syllables based on the tables of FIGS. 3 and 4. The system includes a key board 10 containing a plurality of keys each representing a different English language character, a microprocessor 20 coupled to key board 10, a memory 30 connected to microprocessor 20 and having a lookup table 31 storing a unique and unambiguous correspondence between Korean characters and their English equivalents (transliterants), with the table that is constructed to assure phonetic fidelity between pronunciation of the said individual characters of Korean language and the corresponding Latin expressons. FIG 6 also represents a Korean language input system wherein keyboard 10 receives keystrokes of English syllables and microprocessor 20 automatically converting the inputted English syllables into syllables of Korean language when each inputted English syllable is followed by the depression of the space key on the keyboard.

A video display device 50 is connected to microprocessor 20 and displaying on a screen any combination of the correspondence stored in the lookup table 31, the source passage, and the destination passage. A printer 60 is connected to microprocessor 20 able to print either the source passage or the destination passage as desired.

The transliteration system given by FIGS. 3 and 4 can be used as a method for inputting Korean language into the computer using a Standard English keyboard. The inputted English syllable is converted into Korean syllable when the space key is depressed after the English syllable is typed. For example, if the user wants to generate syllables of Korean language "미국특허청", the user inputs MI, space key, GOOG, space key, TEUG, space key, HU, space key, CHUNG, and space key.

FIGS. 7A through 7F illustrates a visual display displaying the input process for converting English syllables received from the keyboard into Korean syllables according to the input method exemplified FIG. 5. If the user inputs English language alphabet TEUG and a space indicated by a manual depression of a space bar provided by keyboard 10, TEUG of the English syllables is automatically converted into the Korean syllable "특". If the user inputs HU, a space, CHUNG, and a space in sequence, HU and CHUNG are automatically converted into "허청" thereby sequentially "특허청" The converted syllables of Korean language may be stored in memory 30 and displayed on the video display device 50 as shown in FIGS. 7A through 7F.

Figure 8A:
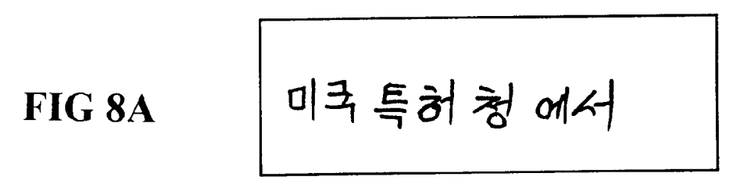
FIGS. 8A through 8C show visual displays illustrating the romanization process according to the present invention in accordance with the tables of FIGS. 3 and 4, and FIGS. 8D through 8F show the display illustrating reverse transliteration.
Figure 8B:
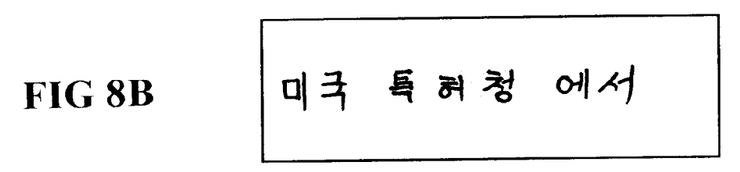
Figure 8C:
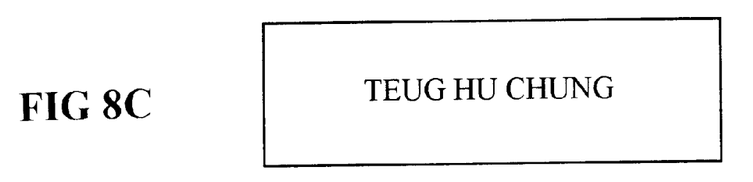
Figure 8D:
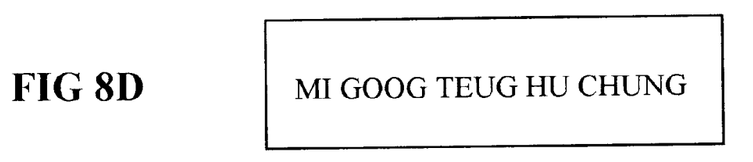
Figure 8E:
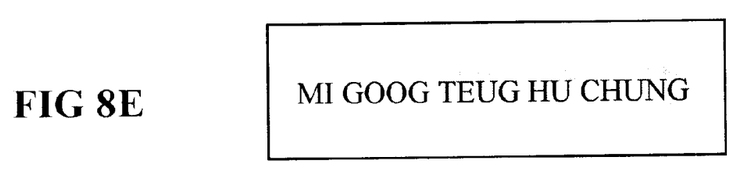
Figure 8F:
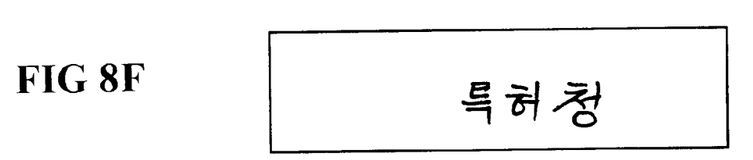

FIGS. 8A through 8C shows a visual display displaying the transliteration from a Korean passage having serial groups of Korean syllables into an English passage having serial groups of English syllables. When the Korean passage stored in memory 30 is displayed on the screen of video display device 50, the user may highlight a portion of the Korean passage to be transliterated as shown in FIG. 8B. The only highlighted portion "특허청" out of the Korean passage "미국특허청청에서" is transliterate into English syllables as shown in FIG. 8C in response to a transliteration command, or a designated key, input from keyboard 10, and the transliterated portion is displayed on the screen. FIG. to 8F illustrate reverse transliteration. In FIG. 8E, a portion "TEUG KU CHUNG" out of "MI GOOG TEUG HU CHUNG" is highlighted. FIG. 8F shows the Korean syllables reverse transliterated from the highlighted portion of the English syllables.

Figure 9:
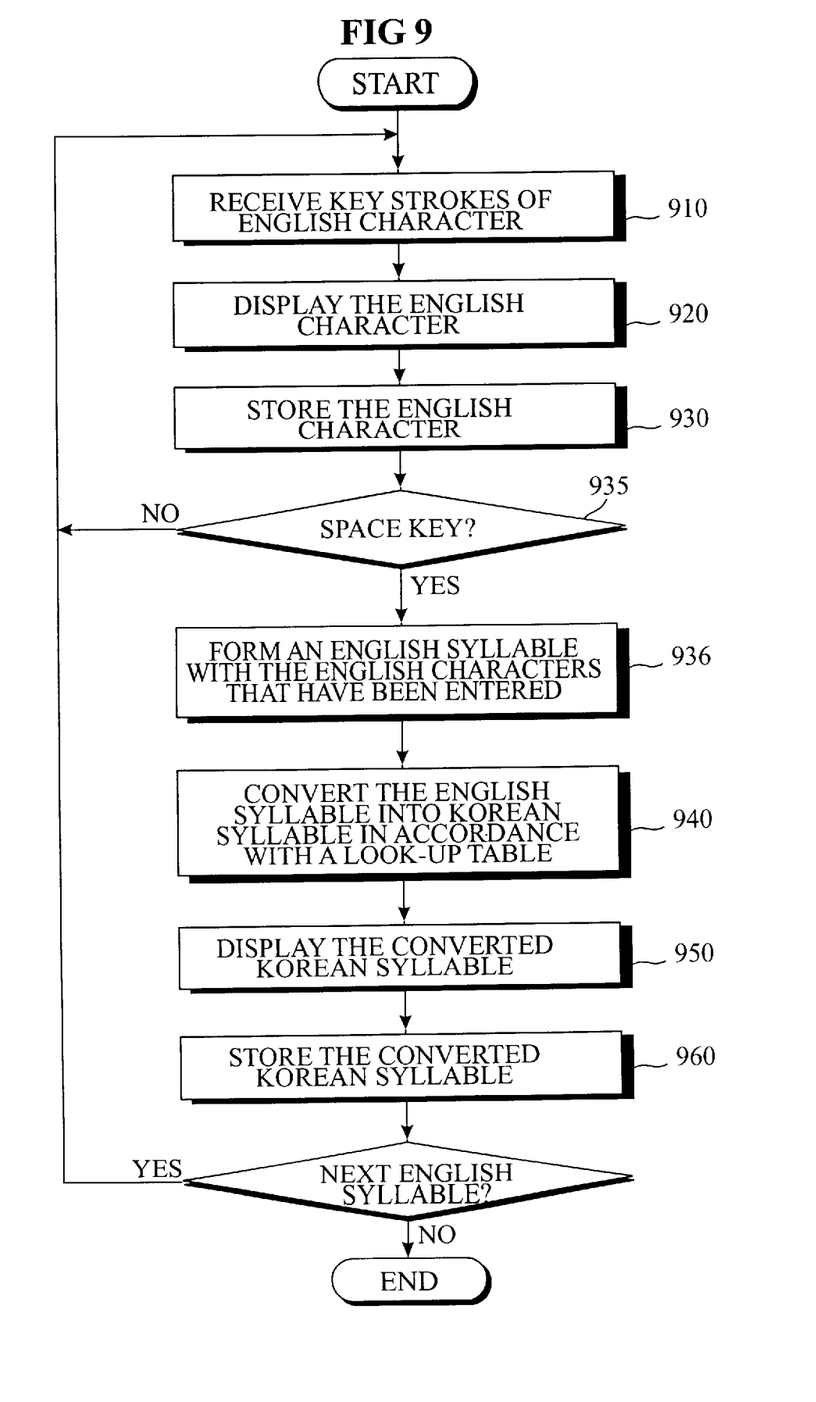
FIG. 9 is a flow chart showing the input method constructed according to the present invention.

FIG. 9 shows a flow chart showing the input method for converting syllables of English language into individual syllables of Korean language. Key strokes of English language are input to microprocessor 20 through keyboard 10 in step 910, and syllables of the English language corresponding to the key strokes are displayed on video display device 50 in step 920 and stored in memory 30 in step 930. In response to a space key in step 935, the input key strokes of English language letters form an English syllable in step 936. The English syllable is converted into syllable of Korean language in step 940 based on the tables shown in FIGS. 3 and 4. The converted syllables of Korean language are displayed on video display device 50 in step 950, and stored in memory 30 in step 960. Depending on the user's input of next English syllables to be converted into Korean syllables, the steps 910 through 960 repeat.

Figure 10:
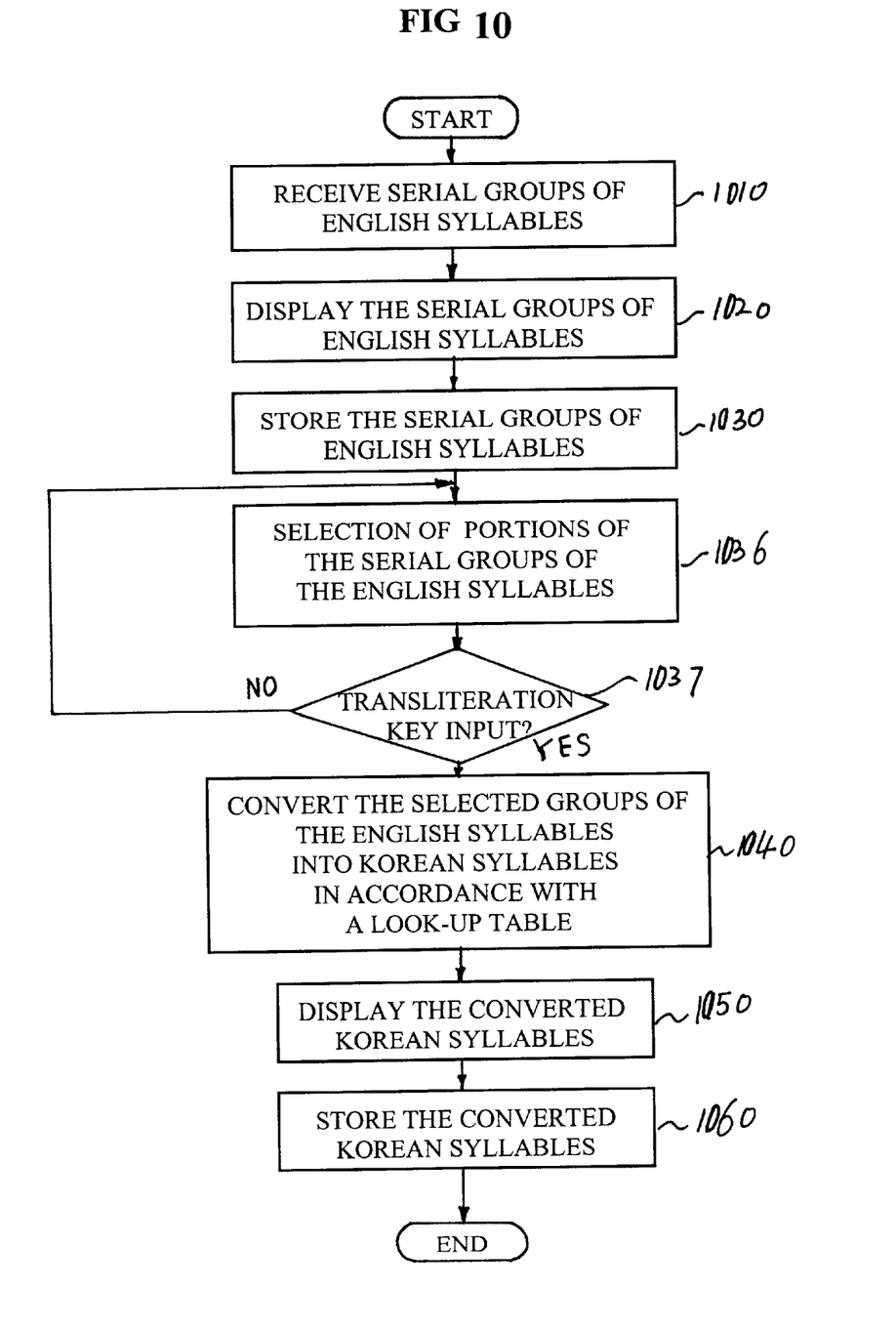
FIG. 10 is a flow chart showing the machine transliteration system automatically converting serial groups of syllables of English language into serial groups of syllables of Korean language.

FIG. 10 shows an English-to-Korean automatic transliteration system. The English syllables to be transliterated into Korean are entered from keyboard 10, displayed on monitor 50, and stored in memory 30, or alternatively the English syllables are brought into memory 30 from an external source, such as a preexisting computer file (steps 1010, 1020, 1030). In step 1036, the user selects portions or all of serial groups of syllables of the English language which the user wants to convert into syllables of Korean language. In response to a transliteration command or depression of the designated in step 1037, the selected groups of English language are converted into syllables of Korean language in step 1040 based on the tables shown in FIGS. 3 and 4. The converted syllables of Korean language are displayed on video display device 50 in step 1050 and stored in memory 30 in step 1060.

Figure 11:
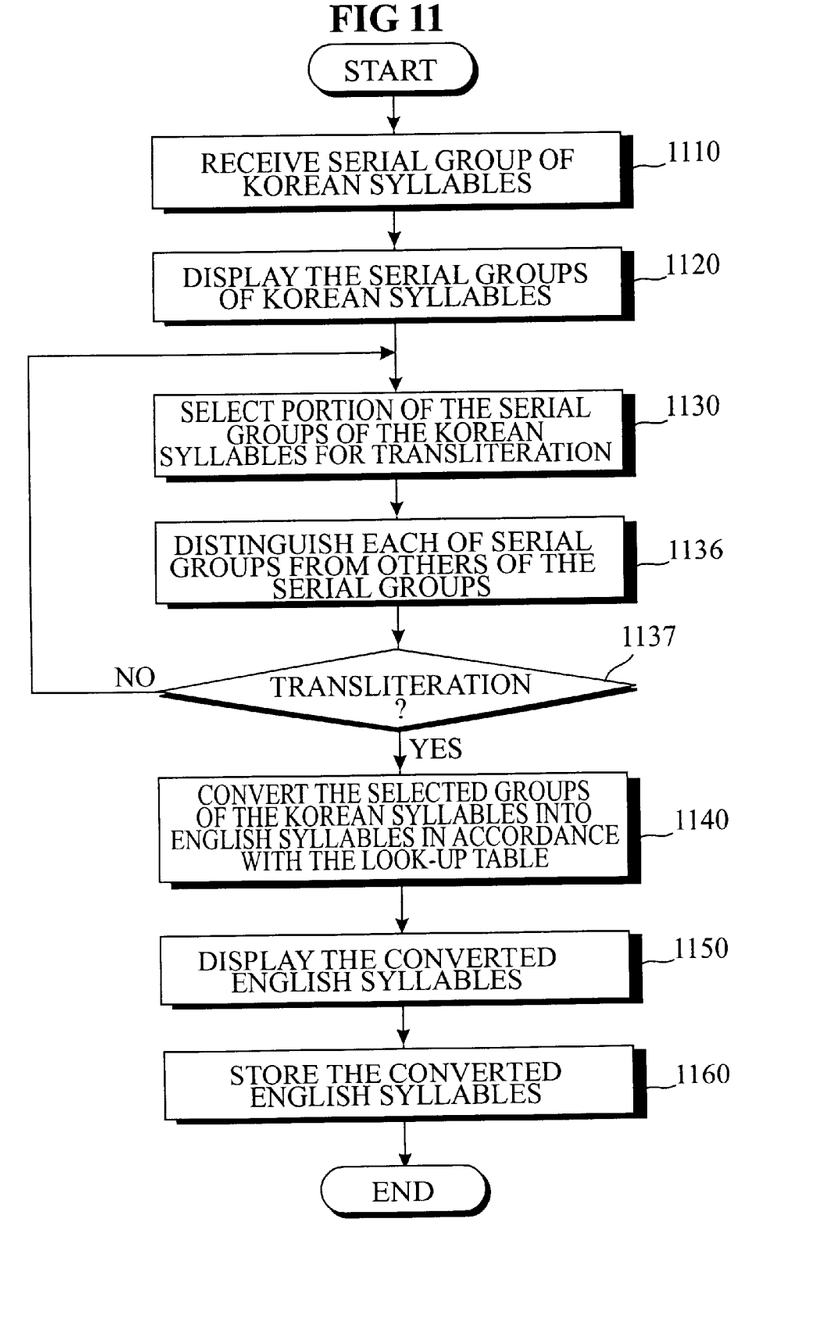
FIG. 11 is a flow chart showing the machine transliteration system automatically converting serial groups of syllables of Korean language into serial groups of syllables of English language.

FIG. 11 shows a Korean-to-English automatic transliteration system for automatically converting a Korean passage of serial groups of syllables of Korean language into individual syllables of English language. Key strokes of Korean language for the Korean passage are input to microprocessor 20 through keyboard 10, or the Korean passage is received from an external source in step 1110. The Korean passage is displayed on video display device 50 in step 1120 and stored in memory 30. In step 1130, the user selects portions of serial groups of syllables of the Korean language which the user wants to convert into syllables of English language. When the user executes the transliteration command in step 1137, the selected portions of serial groups of the syllables of Korean language are transliterated into serial groups of English language in step 1140 based on the look up tables. The converted syllables of English language are displayed on video display device 50 in step 1150 as shown in FIGS. 8A through 8C and stored in memory 30 in step 1160.

As described above, the computerized transliteration systems constructed by the principle of the present invention show unique and unambiguous conversion between a character or characters of English language and individual characters of Korean language. No ambiguity is shown in the conversion process performed in the system. The characters of English language are converted to and from a single unique character of Korean language without ambiguity as shown in FIGS. 3 and 4. Moreover, conversion in either direction shows assurance of phonetic fidelity between pronunciation of syllables of English language and syllables of Korean language. Furthermore, since a unique and unambiguous correspondence between individual syllables of Korean language having Korean language vowels and Korean language consonants, and syllables of English language having English language vowels and English language consonants is implemented into the computerized transliteration system, the system is able to automatically convert between syllables of English language and syllables of Korean language with unambiguity and phonetic fidelity.

The present invention includes the following features: A strict one-to-one relationship between individual syllables of Korean language having Korean language vowels and Korean language consonants and syllables of English language having English language vowels and English language consonants; One hundred percentage spelling accuracy for both romanization and reverse transliteration; Great accuracy of the pronunciation of personal and geographical names; the simplest romanization system of any foreign language. Even a non-Korean speaker who does not know how the word is pronounced or what it means can use the system by consulting the look-up table constructed according to the present invention.

The input method of this system is provided for Standard English keyboard users. This method allows a Korean syllable to be generated in the computer memory and displayed on the computer screen by typing an English syllable that closely emulates the pronunciation of the Korean syllable to be produced, uses a transliteration table having unambiguous relationship between the English letters to be typed through the keyboard and the Korean characters to be produced on the screen, does not necessarily need a virtual keyboard displayed on the screen because of the phonetic equivalence between the English Key depressed and the Korean letter generated on the screen, and creates the Korean syllables corresponding to the typed English syllables by inputting a space key stroke after each English syllable is entered.

In the machine transliteration system, Korean syllables of Korean document stored in a Korean word processor are automatically converted into English syllables according to the look-up table of the memory. For example, a Korean name, 김대중, is automatically transliterated into Gim Dae Joong. A space is created between Gim and Dae and between Dae and Joong. Since the individual syllables are separated from each other by a space, a Korean name, 한아름, is romanized into Han A Reum instead of Hanareum or Ha Na Reum.

What is claimed is:

1. A transliteration system, comprising:

an input device inputting at least one English syllable into said transliteration system;

a storage medium storing said at least one English syllable;

a lookup table stored in said transliteration system, said look up table showing a correspondence between individual Hangul letters and individual sets of English characters, each set comprising at least one English character, wherein ㄱ assigned to G, ㄴ assigned to N, ㄷ assigned to D, ㄹ assigned to R when ㄹ is an initial consonant, ㄹ assigned to L when ㄹ is a final consonant, ㅁ assigned to M, ㅂ assigned to B, ㅅ assigned to S, ㅇ assigned to none when ㅇ is an initial letter of a Korean syllable, ㅇ assigned to NG when ㅇ is the final letter of a Korean syllable, ㅈ assigned to J, ㅊ assigned to CH, ㅋ assigned to K, ㅌ assigned to T, ㅍ assigned to P, ㅎ assigned to H, ㅏ assigned to A, ㅑ assigned to YA, ㅓ assigned to U, ㅕ assigned to YU, ㅗ assigned to O, ㅛ assigned to YO, ㅜ assigned to OO, ㅠ assigned to YOO, ㅡ assigned to EU, ㅣ assigned to I, ㅐ assigned to AE, ㅒ assigned to YAE, ㅔ assigned to E, ㅖ assigned to YE, ㅘ assigned to WA, ㅙ assigned to WAE, ㅚ assigned to OE, ㅝ assigned to WO, ㅞ assigned to WE, ㅟ assigned to WI, and ㅢ assigned to UI;

a microprocessor coupled to said input device, said storage medium, and a monitor, said microprocessor converting the inputted at least one English syllable into a corresponding Korean syllable in accordance with said lookup table; and said monitor displaying the inputted at least one English syllable and the converted Korean syllable.

2. The transliteration system of claim 1, wherein said input device is a keyboard and said microprocessor converts each said inputted English syllable into a corresponding Korean syllable in accordance with said look up table when a space key on said key board is depressed after each said English syllable is inputted.

3. The transliteration system of claim 1, wherein said microprocessor converts a portion of the inputted at least one English syllable into a corresponding Korean syllable in accordance with said look up table when a user selects the portion among said inputted at least one English syllable and executes a transliteration command.

4. The transliteration system of claim 1, wherein said microprocessor is able to reconvert the converted Korean syllable into said at least one English syllable in accordance with said look up table.

5. A transliteration system, comprising:
   an input device inputting at least one Korean syllable into said transliteration system;
   a storage medium storing said at least one Korean syllable;
   a lookup table stored in said transliteration system, said look up table showing a correspondence between individual Hangul letters and individual sets of English characters, each set comprising at least one English character, wherein ㄱ assigned to G, ㄴ assigned to N, ㄷ assigned to D, ㄹ assigned to R when ㄹ is an initial consonant, ㄹ assigned to L when ㄹ is a final consonant, ㅁ assigned to M, ㅂ assigned to B, ㅅ assigned to S, ㅇ assigned to none when ㅇ is an initial letter of a Korean syllable, ㅇ assigned to NG when ㅇ is the final letter of a Korean syllable, ㅈ assigned to J, ㅊ assigned to CH, ㅋ assigned to K, ㅌ assigned to T, ㅍ assigned to P, ㅎ assigned to H, ㅏ assigned to A, ㅑ assigned to YA, ㅜ assigned to U, ㅠ assigned to YU, ㅗ assigned to O, ㅛ assigned to YO, ㅜ assigned to OO, ㅠ assigned to YOO, ㅡ assigned to EU, ㅣ assigned to I, ㅐ assigned to AE, ㅒ assigned to YAE, ㅔ assigned to E, ㅖ assigned to YE, ㅘ assigned to WA, ㅙ assigned to WAE, ㅚ assigned to OE, ㅝ assigned to WO, ㅞ assigned to WE, ㅟ assigned to WI, and ㅢ assigned to UI;
   a microprocessor coupled to said input device, said storage medium, and a monitor, said microprocessor converting the inputted at least one Korean syllable into a corresponding English syllable in accordance with said lookup table; and
   said monitor displaying the inputted at least one Korean syllable and the transliterated set of English characters.

6. The transliteration system of claim 5, wherein, when a user selects a portion of the inputted at least one Korean syllable and executes a transliteration command, said microprocessor converts the selected portion into the corresponding English syllable in accordance with said lookup table.

7. The transliteration system of claim 5, wherein said microprocessor displays the converted English syllables separated by spaces after the Korean syllables are inputted and converted.

8. The transliteration system of claim 5, wherein said storage medium stores the converted English syllable.

9. The transliteration system of claim 5, wherein said microprocessor reconverts the converted English syllable into the at least one Korean syllable in accordance with said look up table.

10. A method for generating a Korean syllable in a computer by inputting an English syllable, the method comprising the steps of:
    providing the computer with a lookup table, said look up table showing a unique and unambiguous correspondence between individual Hangul letters and individual sets of English characters, each set comprising at least one English character;
    inputting the English syllable into the computer;
    depressing a space key right after each English syllable is inputted;
    executing a transliteration from the inputted English syllable to the corresponding Korean syllable in accordance with said lookup table after the depressing step; and
    generating the Korean syllable by replacing the inputted English syllable with the corresponding Korean syllable,
    wherein said lookup table shows a correspondence between individual Hangul letters and individual sets of English characters, each set comprising at least one English character, wherein ㄱ assigned to G, ㄴ assigned to N, ㄷ assigned to D, ㄹ assigned to R when ㄹ is an initial consonant, ㄹ assigned to L when ㄹ is a final consonant, ㅁ assigned to M, ㅂ B, ㅅ assigned to S, ㅇ assigned to none when ㅇ is an initial letter of a Korean syllable, ㅇ assigned to NG when ㅇ is the final letter of a Korean syllable, ㅈ assigned to J, ㅊ assigned to CH, ㅋ assigned to K, ㅌ assigned to T, ㅍ assigned to P, ㅎ assigned to H, ㅏ assigned to A, ㅑ assigned to YA, ㅜ assigned to U, ㅠ assigned to YU, ㅗ assigned to O, ㅛ assigned to YO, ㅜ to assigned to OO, ㅠ assigned to YOO, ㅡ assigned to EU, ㅣ assigned to I, ㅐ assigned to AE, ㅒ assigned to YAE, ㅔ assigned to E, ㅖ assigned to YE, ㅘ assigned to WA, ㅙ assigned to WAE, ㅚ assigned to OE, ㅝ assigned to WO, ㅞ assigned to WE, ㅟ assigned to WI, and ㅢ assigned to UI.

11. A method for converting English syllables into Korean syllables in a computer, the method comprising the steps of;
    providing the computer with a lookup table, said look up table showing a unique and unambiguous correspondence between individual Hangul letters and individual sets of English characters, each set comprising at least one English characters;
    inputting the English syllables into the computer;
    selecting a portion among the inputted English syllables;
    inputting a transliteration command into the computer;
    executing a transliteration from the selected portion of the inputted English syllables to the corresponding Korean syllables in accordance with said lookup table; and
    generating Korean syllables by replacing the selected portion of the inputted English syllables with the corresponding Korean syllables,
    wherein said lookup table shows a correspondence between individual Hangul letters and individual sets of English characters, each set comprising at least one English character, wherein ㄱ assigned to G, ㄴ assigned to N, ㄷ assigned to D, ㄹ assigned to R when ㄹ is an initial consonant, ㄹ assigned to L when ㄹ is a final consonant, ㅁ assigned to M, ㅂ assigned to B, ㅅ assigned to S, ㅇ assigned to none when ㅇ is an initial letter of a Korean syllable, ㅇ assigned to NG when ㅇ is the final letter of a Korean syllable, ㅈ assigned to J, ㅊ assigned to CH, ㅋ assigned to K, ㅌ assigned to T, ㅍ assigned to P, ㅎ assigned to H, ㅏ assigned to A, ㅑ assigned to YA, ㅜ assigned to U, ㅠ assigned to YU, ㅗ assigned to O, ㅛ assigned to YO, ㅜ assigned of to OO, ㅠ assigned to YOO, ㅡ assigned to EU, ㅣ assigned to I, ㅐ assigned to AE, ㅒ assigned to YAE, ㅔ assigned to E, ㅖ assigned to YE, ㅘ assigned to WA, ㅙ assigned to WAE, ㅚ assigned to OE, ㅝ assigned to WO, ㅞ assigned to WE, ㅟ assigned to WI, and ㅢ assigned to UI.

12. A method for converting Korean syllables into English syllables, said method comprising the step of:

romanizing each Korean syllable into a corresponding English syllable by looking up a table showing a correspondence between individual Hangul letters and individual sets of English characters, each set comprising at least one English character, wherein ㄱ assigned to G, ㄴ assigned to N, ㄷ assigned to D, ㄹ assigned to R when ㄹ is an initial consonant, ㄹ assigned to L when ㄹ is a final consonant, ㅁ assigned to M, ㅂ assigned to B, ㅅ assigned to S, ㅇ assigned to none when ㅇ is an initial letter of a Korean syllable, ㅇ assigned to NG when ㅇ is the final letter of a Korean syllable, ㅈ assigned to J, ㅊ assigned to CH, ㅋ assigned to K, ㅌ assigned to T, ㅍ assigned to P, ㅎ assigned to H, ㅏ assigned to A, ㅑ assigned to YA, ㅓ assigned to U, ㅕ assigned to YU, ㅗ assigned to O, ㅛ assigned to YO, ㅜ assigned to OO, ㅠ assigned to YOO, ㅡ assigned to EU, ㅣ assigned to I, ㅐ assigned to AE, ㅒ assigned to YAE, ㅔ assigned to E, ㅖ assigned to YE, ㅘ assigned to WA, ㅙ assigned to WAE, ㅚ assigned to OE, ㅝ assigned to WO, ㅞ assigned to WE, ㅟ assigned to WI, and ㅢ assigned to UI.

13. A method for converting English syllables into Korean syllables, said method comprising the step of:

transliterating each separated English syllable into a corresponding Korean syllable by looking up a table showing a correspondence between individual sets of English characters and individual Hangul letters, each set of English characters comprising at least one English character, wherein G assigned to ㄱ, N assigned to ㄴ, D assigned to ㄷ, R assigned to an initial consonant ㄹ, L assigned to a final consonant ㄹ, M assigned to ㅁ, B assigned to ㅂ, S assigned to ㅅ, NG assigned to a final letter ㅇ of a Korean syllable, J assigned to ㅈ, CH assigned to ㅊ, K assigned to ㅋ, T assigned to ㅌ, P assigned to ㅍ, H assigned to ㅎ, A assigned to ㅏ, YA assigned to ㅑ, U assigned to ㅓ, YU assigned to ㅕ, O assigned to ㅗ, YO assigned to ㅛ, OO assigned to ㅜ, YOO assigned to ㅠ, EU assigned to ㅡ, I assigned to ㅣ, AE assigned to ㅐ, YAE assigned to ㅒ, E assigned to ㅔ, YE assigned to ㅖ, WA assigned to ㅘ, WAE assigned to ㅙ, OE assigned to ㅚ, WO assigned to ㅝ, WE assigned to ㅞ, WI assigned to ㅟ, UI assigned to ㅢ, and, ㅇ assigned as a first letter of the Korean syllable when the converted Korean syllable does not have a consonant in a first letter position.

\* \* \* \* \*